No. 818,749. PATENTED APR. 24, 1906.
J. DAIN.
HAY STACKER.
APPLICATION FILED DEC. 1, 1905.
4 SHEETS—SHEET 1.
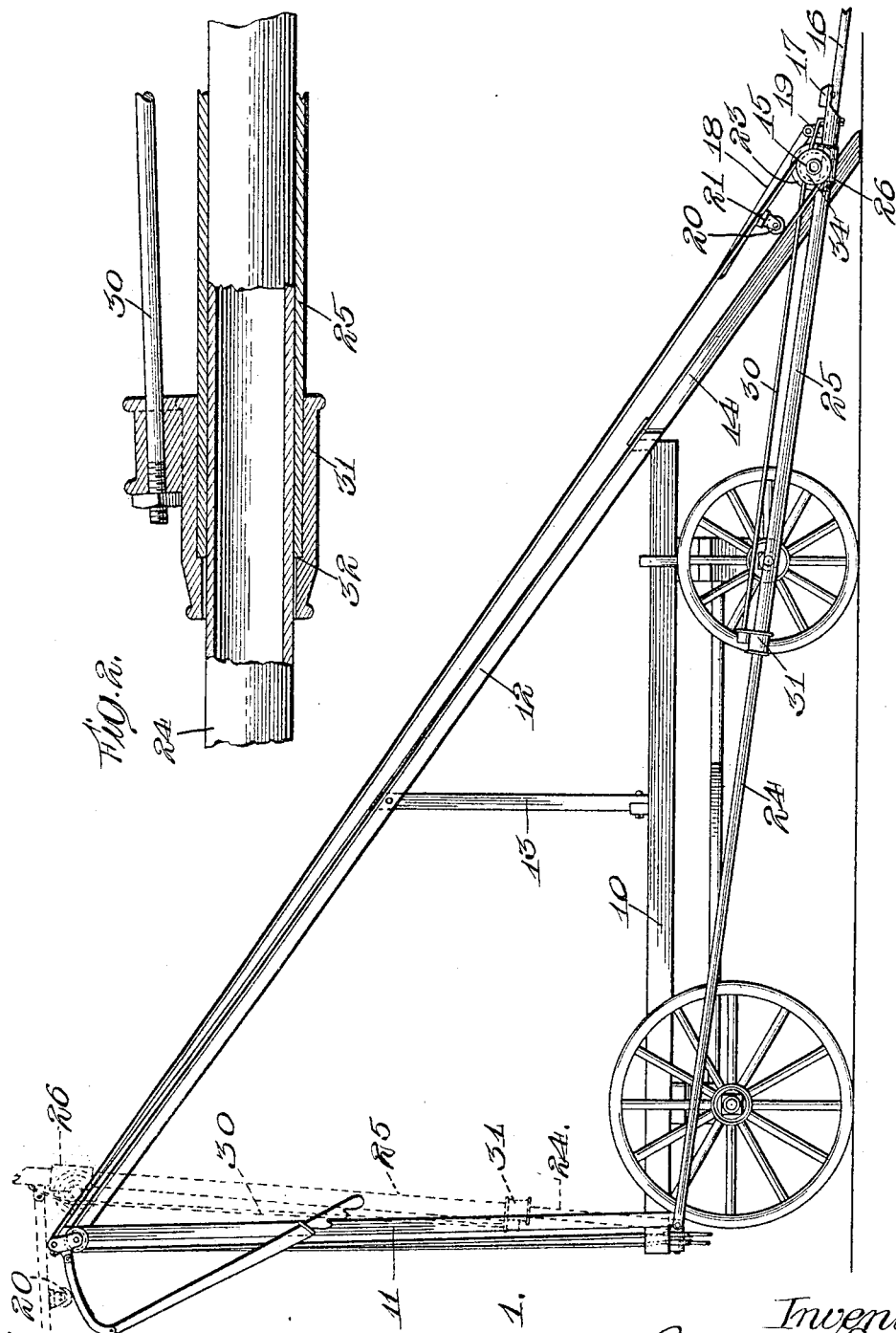

No. 818,749. PATENTED APR. 24, 1906.
J. DAIN.
HAY STACKER.
APPLICATION FILED DEC. 1, 1905
4 SHEETS—SHEET 2.
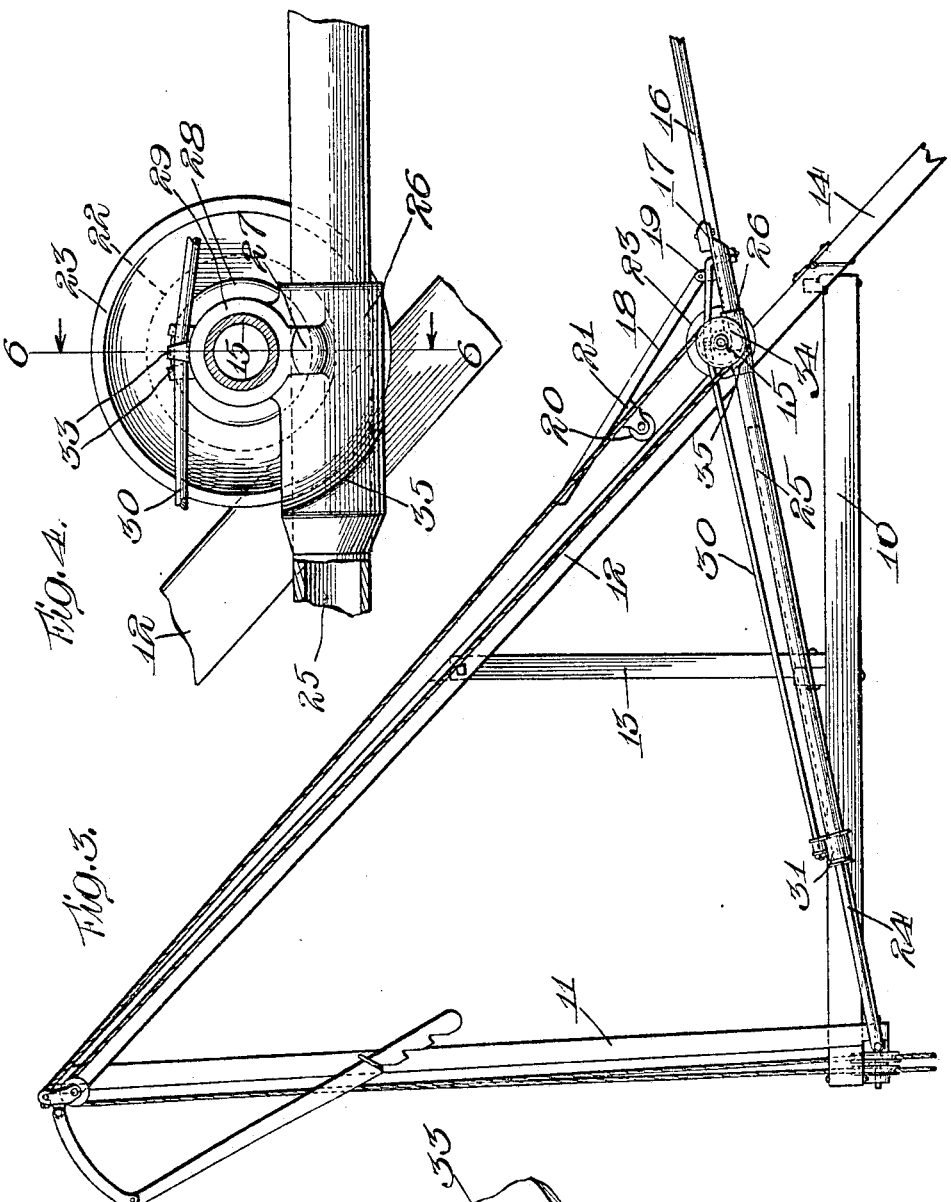

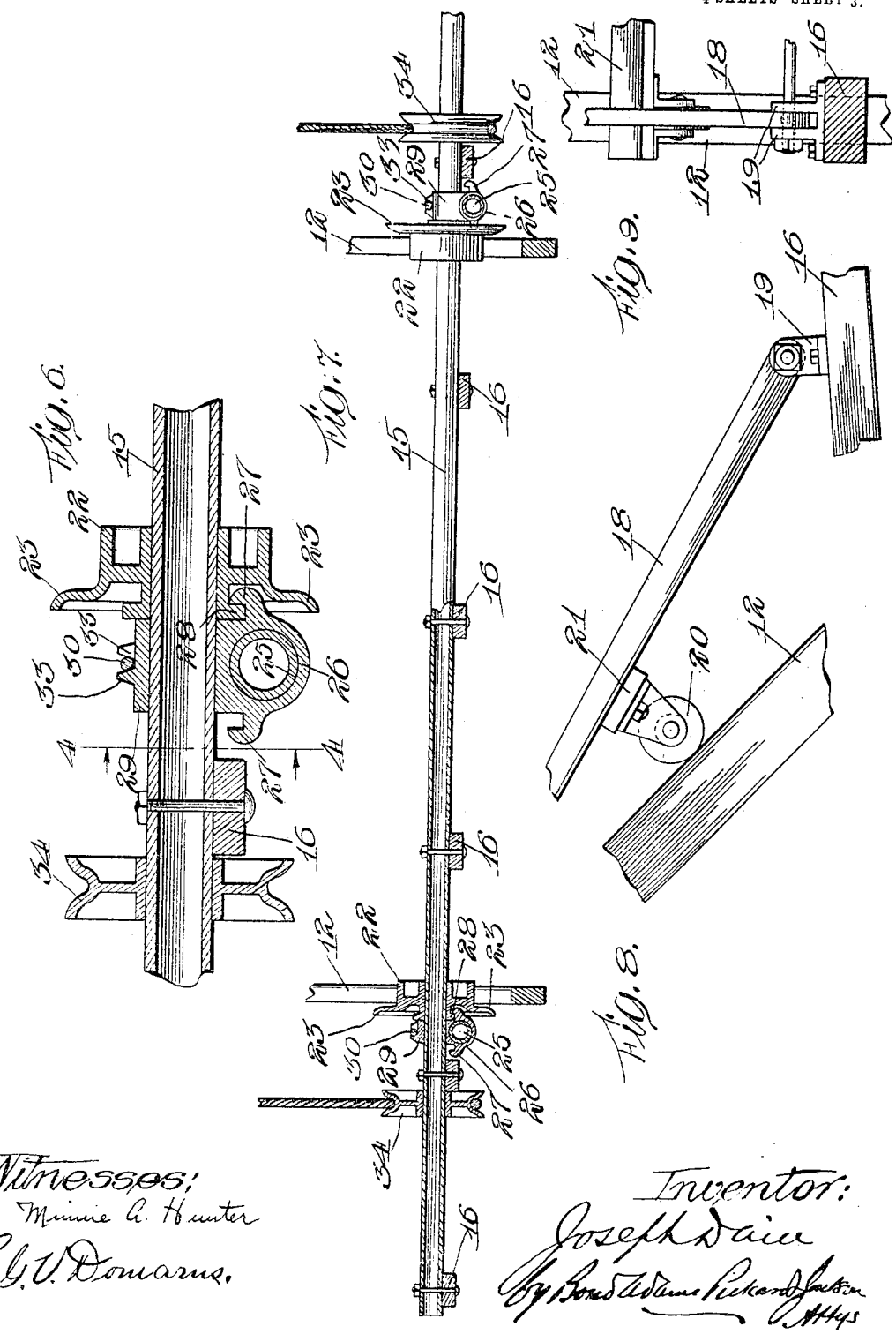

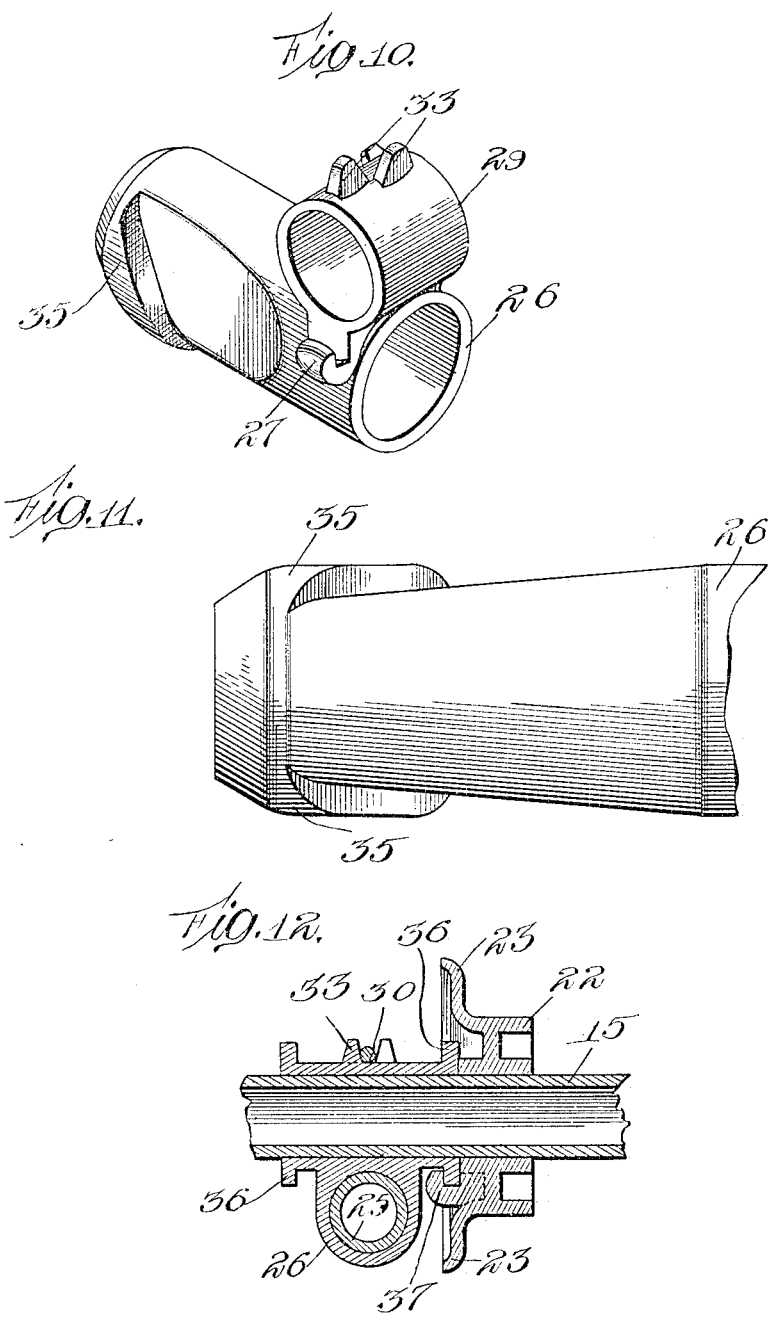

UNITED STATES PATENT OFFICE.

JOSEPH DAIN, OF OTTUMWA, IOWA.

HAY-STACKER.

No. 818,749.  Specification of Letters Patent.  Patented April 24, 1906.

Application filed December 1, 1905. Serial No. 289,802.

*To all whom it may concern:*

Be it known that I, JOSEPH DAIN, a citizen of the United States, residing at Ottumwa, in the county of Wapello, State of Iowa, have invented certain new and useful Improvements in Hay-Stackers, of which the following is a full and complete specification, reference being had to the accompanying drawings.

This invention relates to machines of the kind adapted to receive a large quantity of hay from a sweep-rake or other device, the hay being received on a wide stacker-head that is attached to pivoted arms, such stacker-head being adapted to be drawn upward to the top of the machine and at the limit of its upward movement deposit the hay carried by it to form the desired pile in the field or elsewhere where the hay is being accumulated, the pivoted arms, of course, turning on their pivots during this movement and affording support to the stacker-head.

It is common to guide the stacker-head in its movement by means of wheels or rollers running on inclined bars; but owing to the rough handling received by such machines and owing to the practical impossibility of keeping the said pivoted bars that are attached to the stacker-head absolutely rigid at all times it is found to be necessary to provide means for preventing the rollers from jumping the track, and thereby causing serious inconvenience and delays in the further operation of the machine.

It is the object of my invention to provide cheap and simple means for effectually insuring the retention of these guide rollers or wheels on their inclined track at all times. I accomplish this object by the means shown in the drawings and hereinafter specifically described.

That which I believe to be new will be pointed out in the claims.

In the drawings, Figure 1 is a side elevation of a well-known form of hay-stacker provided with my improvements. Fig. 2 is a detail, partly in section, of one of the telescopic pivoted bars attached to the stacker-head. Fig. 3 is a side elevation of the stacker shown in Fig. 1, but with the running-gear of Fig. 1 omitted and showing the stacker-head partially raised. Fig. 4 is a detail, being a side elevation of one of the rollers or wheels attached to the stacker-head and showing also in side elevation one of the devices journaled to the axle of such wheel with which one of the pivoted side bars engages. This figure is taken at line 4 4 of Fig. 6, the axle referred to being shown in section. Fig. 5 is a detail, being a perspective view of the upper surface of the wheel-retaining device that fits over the axle of the wheel or pulley and showing the means provided for retaining the truss-rod in position. Fig. 6 is a section at line 6 6 of Fig. 4. Fig. 7 is a view, partly in elevation and partly in section, showing the supporting wheels or rollers for the stacker-head, the axle that they are mounted upon, and the means for holding such wheels in place, and showing also some other parts connected with said axle. Fig. 8 is a detail showing a portion of the stacker-head and one of the inclined tracks upon which it is moved. Fig. 9 is a detail, being an end view of the parts shown in Fig. 8. Fig. 10 is a detail, being a perspective view of the double-sleeve device carried at the forward end of the pivoted side bars, and which is also connected with the stacker-head. Fig. 11 is an enlarged plan view of a part of the device shown in Fig. 10. Fig. 12 is a modification of the means for interlocking the double-sleeve device and one of the wheels or rollers.

Referring to the several figures of the drawings, in which corresponding parts are indicated by the same reference characters, 10 indicates a supporting-frame which in the form of construction shown, is mounted on wheels, so that the machine as a whole can be readily moved from place to place; but the mounting of the device on wheels is not essential to carrying out my present invention. At the rear of the frame 10 are secured vertical posts, one of which is shown and indicated by 11.

12 indicates a pair of parallel track-bars extending diagonally forward from the upper ends of the posts 11, the upper ends of said track-bars being supported by said posts 11 and being supported in the construction shown at their lower forward ends by the forward end of the supporting-frame 10 and also by intermediate vertical supports 13. Inasmuch as the supporting-frame 10 is elevated above the ground by reason of being carried by the wheels referred to, the inclined track-bars are provided with hinged continuations 14, that extend from the frame 10 to the ground, as is usual in such cases.

15 indicates a cross-bar which in the construction shown is in the form of a tube, which cross-bar extends across and above the track-bars 12, and, as clearly shown in Fig. 7, this cross-bar extends at its ends for a considerable distance beyond the track-bars 12.

16 indicates forwardly-projecting teeth, the rear ends of which, as best shown in Fig. 7, are bolted to the cross-bar 15 and are secured together by another cross-bar 17 forward of the cross-bar 15. 18 indicates another series of teeth pivotally attached to short uprights 19, carried by the respective teeth 16.

20 indicates a pair of small wheels appropriately secured by brackets to a bar 21, extending across and connecting the teeth 18 together, these wheels 20 being adapted to roll on the track-bars 12.

The forwardly-projecting teeth 16 and the teeth 18, pivotally attached thereto, constitute, with their respective connections, a form of carrier which is generally termed a "stacker-head."

22 indicates a pair of wheels or rollers considerably larger and heavier than the small wheels 20, just referred to, which wheels or rollers 22 are journaled upon the tubular cross-bar 15 and so located as to bear and run upon the inclined track-bars 12. Each of these wheels in the construction shown has at its outer face a wide flange 23, adapted to bear against the outer face of its inclined track-rail 12.

24 25 indicate an arm pivoted at its rear end to the frame 10, near the rear end of such frame or to a suitable bracket or support attached to said frame 10, the part 25 being slidingly mounted on the part 24 in a telescopic manner. The forward end of this part 25 is securely connected with the stacker-head, as hereinafter described.

26 indicates a sleeve through which the part 25 passes and in which it is supported near its forward end.

27 indicates a recessed ear extending laterally from each side of the sleeve 26. Into the recess of one of such ears there projects a vertical flange 28, formed with the hub portion of the wheel 22, such wheel being properly recessed, as clearly shown in Fig. 6, to receive the projecting ear 27. Necessarily only one ear 27 of each sleeve can engage a wheel; but the sleeves are provided with two ears, so that the sleeve can be used interchangeably on the right and left hand sides of a machine. This sleeve 26 carries above it a second sleeve 29, arranged substantially at right angles to the sleeve 26, through which sleeve 29 passes the tubular cross-piece 15.

30 indicates a truss-rod secured at its rear end in any suitable manner, preferably in an adjustable manner, as shown in Fig. 2, to a collar 31, fitted over the rear end of the tubular arm 25 and passing over the sleeve 29 and secured in any suitable manner at its forward end to the forward end of said tubular arm 25. The collar 31 in the construction shown is provided with a shoulder 32, that abuts against the rear end of the tubular arm 25, so as to prevent such collar slipping forward on said arm. As shown in Figs. 5 and 6, the upper surface of the sleeve 29, that the tubular cross-arm 15 passes through, is provided with a series of projections 33, between which the truss-rod 30 passes, thus insuring said truss-rod against slipping out of place. This truss-rod 30 acts to greatly stiffen the telescopic rod 24 25 as a whole, as will be readily understood.

It is to be understood that the parts just described are to be duplicated for each side of the machine.

The sleeve 26 is diminished in diameter from side to side for a portion of its length, as best shown in Fig. 10, and at its inner end is thickened to provide two lateral lugs 35, each of such lugs being provided with a curved face corresponding substantially to the curvature of the rim 23 of one of the wheels or rollers 22. When the parts are in place, this rim of one of the wheels or rollers 22 will lie close to one side of the sleeve 26, and the lug 35 at that side will be opposite the edge of such rim 23. By making the sleeve 26 in this manner should the stacker-head be lifted from the inclined track during the operation of the machine from any cause this lateral lug that projects past and opposite the rim 23 would upon the settling of the stacker-head toward the track strike on the edge of the track and guide the stacker-head properly, so that the treads of the wheels would come on the track, and thereby avoid any possibility of the wheel-rim 23 striking upon the track. Each side of the sleeve 26 is provided with one of these projections 35, so as to enable the device to be applied without difficulty to either the right or the left hand side of the machine.

I have described the interlocking of the sleeve device with the wheels 22 as being accomplished by providing such sleeve device with the recessed ears 27, which engage a vertical flange 28, formed with the hub portion of each wheel. It is evident that a modification of this construction would be to provide a flange at the end of the sleeve 29, which fits into one or more recessed ears carried by the hub portion of the wheel. This modification I have illustrated in Fig. 12 and have indicated the flange on the end of the sleeve 29 by 36 and the ear carried by the wheel as 37. Each end of the sleeve 29 is provided with a flange 36 to adapt it to either right or left hand use.

By my invention it will be seen that the wheels 22, while free to turn on their axle 15 when the stacker-head is being moved into its receiving or discharging position, are very securely held from running off the inclined track-bars 12, owing to the interlocking engagement of such wheels with the sleeves through which the outer ends of the telescopic pivoted bars pass.

34 indicates pulleys suitably mounted on the cross-bar 15, that forms the axle of the wheels 22, over which pulleys run elevating-ropes that are carried up and around other suitable pulleys at the upper ends of the rear posts 11 and thence over other pulleys carried by the frame 10, near the rear end thereof, through which ropes and pulleys the stacker-head is raised as desired and as is well understood, and as such devices form no part of my present invention it is not necessary to here more specifically describe them.

In operation with the parts as shown in Fig. 1 a quantity of hay will be deposited on the forwardly-projecting teeth 16, either by a sweep-rake or otherwise, after which through the usual hoisting-ropes the stacker-head will be pulled up into discharging position, the wheels or rollers 22 running, as usual, upon the inclined track-bars 12 and the tubular arm 25 of course gradually moving upon the arms 24 as the distance between the pivots of such arms 24 and the tubular cross-bar 15 varies, as is common and well known. No matter what racking strain the stacker-head or other parts may be subjected to, which would ordinarily cause the supporting wheels or rollers 22 to jump the track or bind against the track, the construction here illustrated and described will hold the parts rigidly in place and permit at all times of the rapid and easy movement of the stacker-head between its loading and discharging points.

What I claim as new, and desire to secure by Letters Patent, is—

1. The combination with a carrier, a wheel therefor, and a track for said wheel, of a movable arm connected with said carrier, and interlocking devices carried by said wheel and arm to hold said wheel in position on the track, substantially as described.

2. The combination with a carrier, a wheel therefor, a flange projecting from one face of said wheel, and a track for said wheel, of a movable arm connected with said carrier, a sleeve into which said arm projects, means for connecting said sleeve with said carrier, and a lateral projection on said sleeve adapted to engage the said projecting flange to hold said wheel in position on the track, substantially as described.

3. The combination with an inclined track and a wheeled carrier adapted to run thereon, of a pivoted arm movable with said carrier, and a device carried by said arm adapted to directly engage a wheel of said carrier to hold it to its track, substantially as described.

4. The combination with an inclined track, a carrier adapted to run thereon, and a wheel for said carrier having a flange extending from its hub portion, of a pivoted arm movable with said carrier, and a device carried by said arm adapted to engage said flange, substantially as described.

5. The combination with an inclined track, a carrier adapted to run thereon, and a wheel for said carrier having a flanged portion extending out from one face thereof, of a pivoted arm movable with said carrier, and a device carried by said arm adapted to engage said flanged portion, substantially as described.

6. The combination with an inclined track, a carrier adapted to run thereon, and a wheel for said carrier having a flanged portion extending out from one face thereof, of a pivoted arm movable with said carrier, a sleeve through which said arm passes and by which it is connected to said carrier, and a recessed ear on said sleeve adapted to engage said flanged portion, substantially as described.

7. The combination with an inclined track, of a carrier, an axle secured thereto, a wheel on said axle provided with a flange projecting from one face thereof, a pivoted arm, means for connecting said arm and axle, and a recessed ear on said connecting means adapted to receive said flange on the wheel, substantially as described.

8. The combination with an inclined track, of a carrier, an axle secured thereto, a wheel on said axle adapted to run on said track, a pivoted arm, means for connecting said arm and axle, and interlocking devices carried by said wheel and said connecting means, substantially as described.

9. The combination with an inclined track, of a carrier, a wheel secured to said carrier and adapted to move on said track, a pivoted arm movable with said carrier, and means carried by said arm and wheel adapted to interlock, substantially as described.

10. In a hay-stacker, the combination with a stacker-head, a wheel therefor, an inclined track for said wheel, a pivoted arm movable with said stacker-head, a sleeve connecting said arm and stacker-head into which sleeve the forward end of said arm projects, and means carried by said sleeve and wheel adapted to interlock to hold said wheel in position on the track, substantially as described.

11. In a hay-stacker, the combination with a stacker-head, and wheels supporting said stacker-head, of inclined tracks for said wheels, pivoted bars movable with said stacker-head and means carried by said bars for engaging said wheels to hold them to the tracks, substantially as described.

12. In a hay-stacker, the combination with a stacker-head, an axle carried thereby, and a wheel on said axle, of an inclined track for said wheel, a pivoted arm movable with said stacker-head, a device consisting of two connected sleeves one above the other and at substantially right angles to each other, one of said sleeve portions fitting over the said arm and the other over said axle, and devices adapted to interlock carried respectively by said wheel and said double-sleeve device, substantially as described.

13. In a hay-stacker, the combination with a stacker-head, an axle carried thereby, and a wheel on said axle, of an inclined track for said wheel, a pivoted arm movable with said stacker-head, a device consisting of two connected sleeves one above the other and at substantially right angles to each other, one of said sleeve portions fitting over the said arm and the other over said axle, devices adapted to interlock carried respectively by said wheel and said double-sleeve device, and a truss-rod secured to said bar and extending over and bearing upon said double-sleeve device, substantially as described.

14. In a hay-stacker, the combination with a stacker-head, an axle carried thereby, and a wheel on said axle, of an inclined track for said wheel, a pivoted arm movable with said stacker-head, a device consisting of two connected sleeves one above the other and at substantially right angles to each other, one of said sleeve portions fitting over the said arm and the other over said axle, devices adapted to interlock carried respectively by said wheel and said double-sleeve device, and a truss-rod secured to said bar and extending over and bearing upon said double-sleeve device, said double-sleeve device being provided with means for holding said truss-rod in place, substantially as described.

15. The combination with a carrier, a wheel therefor provided with a projecting rim at one side of the tread portion thereof, and a track for said wheel, of a movable arm, a sleeve carried by said arm, interlocking devices carried by said wheel and sleeve, and a lateral lug on said sleeve projecting opposite the said rim of the wheel, substantially as specified.

16. The combination with a wheeled carrier and a track therefor, of a pivoted arm connected with said carrier, said arm being provided near its outer end with a lateral projection adapted to strike against the track if the carrier-wheel leaves the track, substantially as specified.

17. The combination with a wheeled carrier and a track therefor, of a pivoted arm, a sleeve on said arm connected with said carrier, and a lateral projection on said sleeve opposite said track, substantially as specified.

JOSEPH DAIN.

Witnesses:
JOHN J. WOODS,
W. G. DUFFIELD.